Figure 1:
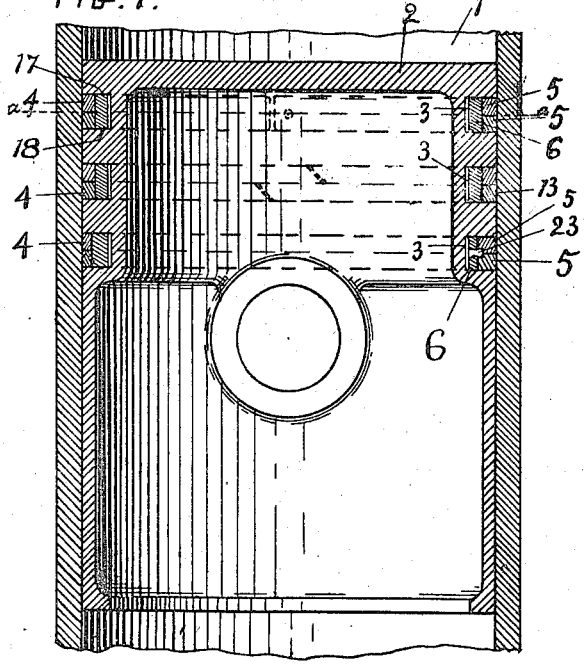

S. S. KURTZ, Jr.
METALLIC PISTON PACKING.
APPLICATION FILED MAY 1, 1916.

1,280,493.

Patented Oct. 1, 1918.
2 SHEETS—SHEET 1.

INVENTOR

Stewart S. Kurtz Jr.

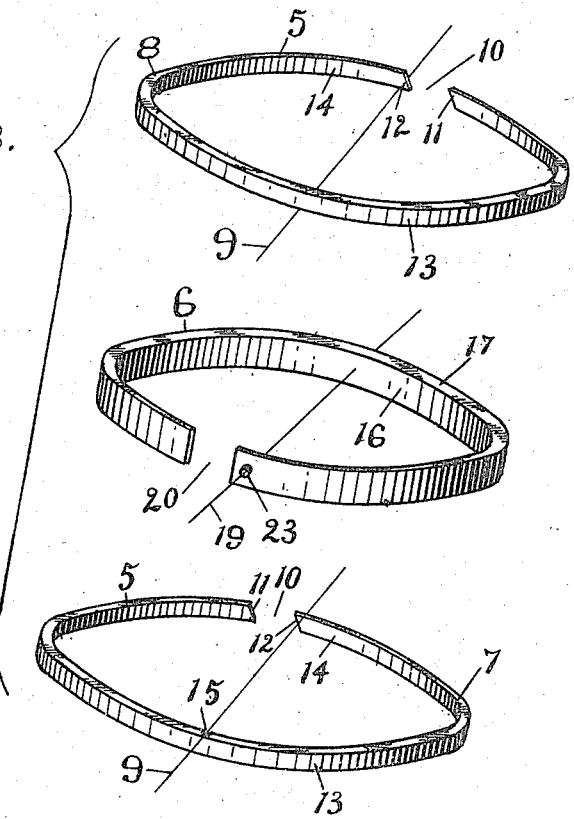
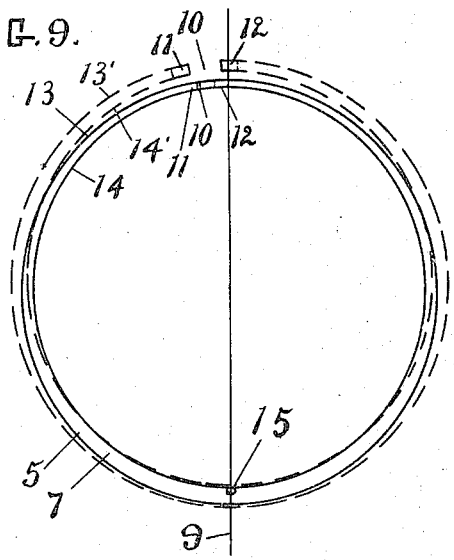
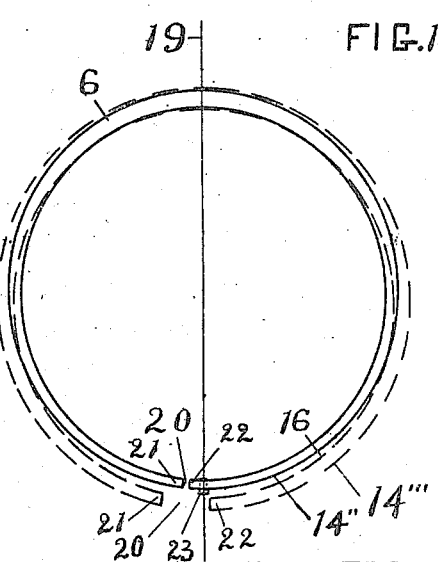

UNITED STATES PATENT OFFICE.

STEWART S. KURTZ, JR., OF CANTON, OHIO.

METALLIC PISTON-PACKING.

1,280,493.   Specification of Letters Patent.   Patented Oct. 1, 1918.

Application filed May 1, 1916. Serial No. 94,641.

*To all whom it may concern:*

Be it known that I, STEWART S. KURTZ, Jr., a citizen of the United States, residing at Canton, county of Stark, State of Ohio, have invented certain new and useful Improvements in Metallic Piston-Packing, of which the following is a specification.

This invention relates to a metallic piston packing of the type embodying an inside expanding spring ring and a plurality of outer cylinder bearing rings mounted upon and surrounding the inner spring ring.

The primary object of my invention is to so construct the packing that a gas-tight joint is made between the periphery of the packing and the inner wall of the cylinder, and to make a gas-tight closure or seal of the expansion spaces of the outer rings, whereby a substantially gas-tight metallic packing is provided for a piston, and the present improvement is more particularly intended for use in internal combustion engines, though it is equally well adapted to be used with any piston, irrespective of its purposes.

Furthermore to provide a construction that will cause a more uniform expansive pressure on the entire circle of the cylinder wall with comparatively light pressure, whereby most of the wear, and uneven wear, of the cylinder wall is eliminated, and in which the packing approximately fills the piston groove in which it works.

Furthermore arranging of a pair of outer eccentric spring open rings mounted side by side on an inner eccentric spring open ring, having the respective thicker and thinner parts of the outer rings accurately registered and the openings not, and having the thicker parts opposite to the thinner part of the inner ring and otherwise formed, to make a practical flexible packing having approximately gas-tight expansion joints.

Furthermore the arranging of a dowel, in a certain location, to hold the three rings from relative rotating circumferentially.

Furthermore the constructing of the outer rings both exactly the same so that they are interchangeable on the inner ring.

The ordinary form of eccentric metallic spring open packing rings is a true circle on the outer and inner side when fully expanded and larger in diameter than that of the cylinder in which it is constructed to work.

When such a ring is contracted and forced into the cylinder, a true circle is lost on its periphery especially near the opening so that it does not fit tight to the cylinder wall at that point and causes great leakage, and it does not bear on the cylinder wall uniformly and such an uneven bearing causes an objectionable uneven wear on the cylinder wall also the expansion opening leaks its full width of the opening, which increases as the ring wears.

With my construction the inner eccentric spring open ring is finished on its periphery to a true circle and working size when inwardly sprung to contracted normal working form, and the outer eccentric spring open rings are finished to a true working circle on the inner and outer surface when inwardly sprung and contracted to normal working form, whereby when the inner ring and the outer rings are assembled in the piston groove and contracted and forced in a determined size cylinder, which it is made for, the expansion of such arranged inner and outer rings is uniformly outward throughout their entire circumference and the outer rings will accurately fit and bear uniformly on the entire circle of the cylinder inner wall, which packs the piston perfectly against leakage and will not wear the cylinders out of their true circular form and will pack an ordinary worn out of round cylinder bore in any direction and the inner ring periphery closes the inner side of the expansion-joint openings of the outer rings perfectly and prevents leakage. Therefore the outer rings having a true circular inner and outer periphery when contracted, and the inner ring having a true outer circular periphery when contracted is regarded a part of the invention. I am aware that it is old for at least 23 years to finish the periphery of a single concentric metallic packing ring when contracted to its cylinder size, which causes the ring to fit approximately tight all around the cylinder wall except at the expansion opening, but it is well known that this ring does not bear uniformly on the cylinder walls due to the ends near the opening being too stiff and the spring of the ring being mostly in a short portion opposite the opening, therefore when in use it tends to wear the cylinder bore out of round, and it will not pack properly in a cylinder bore that is worn a little out of round, also it is distorted in the short spring portion opposite the opening both when expanded over the piston for entering its groove and when closing it in the groove when forcing it in the cylinder, which changes the circular periphery thereof out of said cylinder size circle, and causes a leak past the ring and cylinder inner wall, and I do not claim such. But I do regard as new and a decided improvement the finishing of the inside and outside walls of eccentric metallic expansible piston packing when in inwardly sprung and contracted working form, and regard it as invention chiefly for the reason that it bears approximately uniformly on the cylinder wall all the way around if worn out of round or not, will not wear the cylinder bore wall out of round, will pack the piston properly when the cylinder bore is badly worn out of round (as they are commonly found in internal combustion engines) and will not distort when expanding over the piston and placing them in the piston grooves, as the ring springs approximately uniformly when expanding over the piston.

From the foregoing description it will be understood that the engaging true circle peripheries (when in working positions) of the inner and outer rings at the expansion spaces of the outer rings make a gas-tight inside closure or seal of that section or zone of the rings. The inside sealing of the expansion spaces of the outer rings is the primary function of providing the inner peripheries of the outer rings, and the outer periphery of the inner ring with true circles when in working positions. It will also be understood that this primary function of effecting a gas-tight closure of the outer ring expansion spaces is accomplished by the said true circles at the expansion space section or zone of the rings whether or not the remaining portions of the engaging surfaces of the inner and outer rings are made true circles, when in working positions.

By reason of the three eccentric ring construction with the two rings acting as cylinder bearing rings and with their expansion openings arranged as herein disclosed, the outer rings have tapered portions which gradually merge into their thick portions whereby there is provided independent flexibility of the outer rings by reason of which their outer surfaces are caused to conform to the cylinder wall and their inner surfaces caused to conform to the inner ring, which produces an improved and efficient closure between the outer surface of the outer rings and the cylinder, and an improved and efficient closure of the zone at and close to the expansion spaces of the outer rings, as compared to a structure having three concentric packing rings, and as compared with a two ring eccentric packing ring structure.

Figure 2:
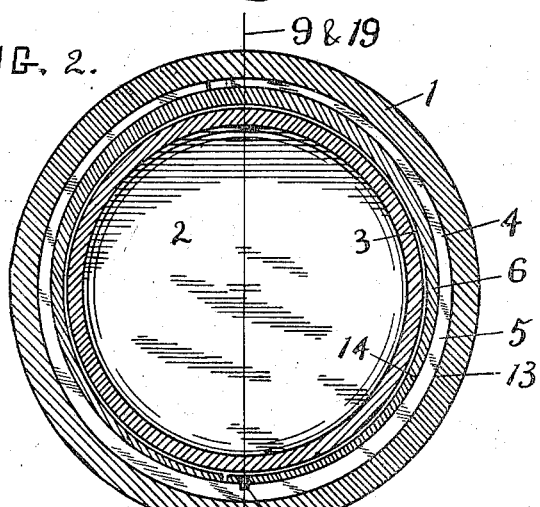
Figure 4:
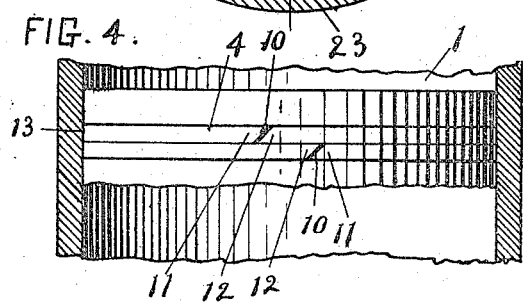
Figure 3:
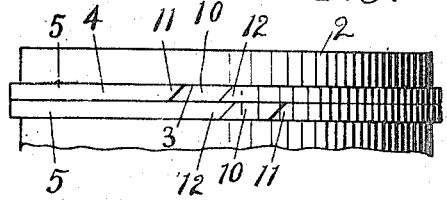
Figure 6:
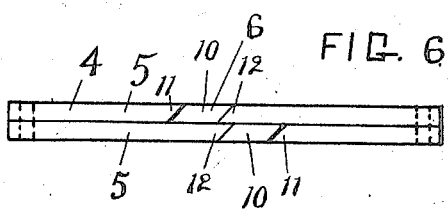
Figure 5:
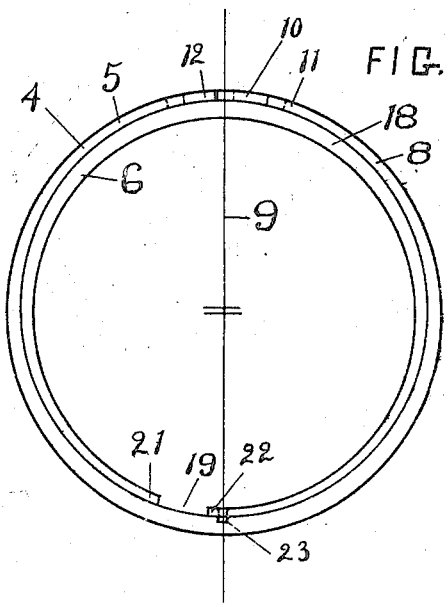
Figure 7:
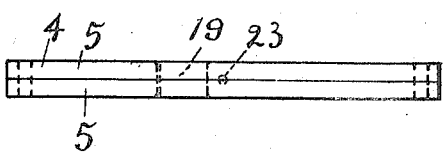

In the drawings, Figure 1 is a sectional view showing a cylinder, and a piston having my improved metallic expansible piston packings therein embodying the invention in a preferred form. Fig. 2 is a sectional view on line aa Fig. 1 looking from below. Fig. 3 is a fragmental view of a piston having the metallic expansible packing therein and showing it fully expanded. Fig. 4 is a fragmental and partly sectional view of the cylinder and piston, with the metallic expansible packing therein and showing it contracted in its normal working form, with the openings nearly closed. Fig. 5 is a side view of the assembled metallic expansible packing free and fully expanded. Fig. 6 is an edgewise view of the assembled packing showing the openings in the outer rings when the packing is expanded. Fig. 7 is an edgewise view of the packing showing the dowel and inner ring opening dotted through. Fig. 8 is a group showing the packing not assembled and a perspective view of the two outer rings and the inner ring. Fig. 9 is a side view of a cylinder bearing ring showing it unfinished and finished in contracted working form. Fig. 10 is a side view of an inner ring showing it unfinished and finished in contracted working form.

In reference to the drawings, reference characters will represent corresponding parts throughout the several views.

A cylinder 1 seen in Figs. 1, 2, 3 and 4 has a piston 2 fitted freely therein in the usual way having play enough to take care of the expansion and contraction variation so that it will not bind in the cylinder. In the piston 2 are accurately finished any number of packing grooves 3, in each of which is placed a closely and freely fitted metallic expansible piston packing 4 embodying my invention in the preferred form. This packing consists of a pair of specifically constructed expansible outer cylinder bearing open rings 5 and 5 preferably made of special cast iron, and a specifically constructed expansible inner open ring 6, preferably made of special cast iron. Each of the rings 5 is constructed exactly alike in this instance, and is an exact duplicate of the other, therefore it will only be necessary to describe the construction of one.

It will be necessary to describe the specific construction of these rings 5 and 6 as the construction embodies part of the invention.

The outer ring 5 is first machined rough (seen in dotted line Fig. 9) to a considerably larger diameter 13' than the cylinder size, and the inner side is machined eccentric to the outer and to a desired size 14'. The sides 7 and 8 are ground to an accurate predetermined width of the ring. An imaginary line 9 is noted which passes through the exact center of the inner and outer diameter and the thicker and thinner portions, and the ring is opened in the thinner portion a determined distance from said imaginary line and a portion taken out leaving the opening 10. The ring is then held contracted in a suitable manner so that the ends 11 and 12 nearly touch, by a special chucking mechanism, (not shown,) then ground to an exact predetermined cylinder size true circle periphery 13, then the inner side is ground eccentric to the periphery and to a determined size true circle 14, thus leaving each inner and outer periphery of the ring 5 a true circle when in its contracted normal working form. A half round recess 15 is made in a predetermined side in this instance 7, accurately on the imaginary line 9, in the thicker portion of the ring, extending from the inner side, and a part way radially across side 7.

The inner ring 6 is first machined rough to a considerable larger diameter 14''' than that of the inner side 14 of the outer ring, and the inner side 16 is machined eccentric to the outer to any desired dimension (seen in dotted lines Fig. 10). The sides 17 and 18 are ground accurately to equal double the width of that of an outer ring 5. An imaginary line 19 is noted which passes through the exact center of the inner and outer diameters and the thicker and thinner portions, and the ring is opened in the thinner portion a short distance from the imaginary line 19 and a portion taken out leaving the opening 20. The ring is then held contracted in a certain manner so that the ends 21 and 22 nearly touch, (not shown,) then ground to the exact size of a true circle 14'' on its periphery to that of the inside diameter 14 of ring 5 in contracted form. A dowel or pin 23 is fixed in the thin portion near the end 22 of the ring, centrally to the width thereof, and on the imaginary line 20 when contracted, and projecting outward a short distance and adapted to engage the recesses 15 of the rings 5 when assembled, and serves to hold all of the rings from relative circumferential rotating, one to the other.

The expansible packing is placed and assembled in the piston groove 3 by first expanding the inner ring enough to pass it on the periphery of the piston until it reaches the groove, then allowing it to contract into the desired one of the grooves 3. Then expand one of the outer rings 5 in the same manner, pass it over the piston to the groove and allow it to contract in, and place it on one side of the dowel 23, so that the recess 15 will engage the dowel 23 and allow the ring to contract into place. Then the other ring 5 is expanded and placed over the piston, and in the groove 3, so that recess 15, will come to the center of the groove on the side to engage the dowel and be allowed to contract inward and the ring is turned until the recess engages the dowel and the ring contracts to place beside the other. Now the packing is expanded larger than the cylinder (seen in Fig. 3).

Any number of grooves in the piston can be supplied with packing in the same manner.

When the piston is being placed in the cylinder the rings are forced and contracted into the cylinder with the piston in the usual way.

In operation, this packing will pack both ways equally for any use it may be used. Assume the packing being used in a vertical internal combustion engine, and the piston is compressing. The packing will be seated and packing mostly on the lower side, especially if the rings do not accurately fit the grooves, the gases being compressed will leak past the packing on the top side into the groove behind the packing but is closed off from passing farther by the lower ring 5 seating on the lower part of the groove and bearing on the cylinder walls, and the lower opening 10 is closed by the inner ring closing it off on the inner side and the upper ring 5 on the top side with their perfectly ground tight fitting contacts, which pack practically leak tight when lubricated in the usual way. Assume now that the piston is making a work stroke and the pressure is driving the piston down, now in normal condition the expansive force of the packing causes friction enough on the cylinder wall to hold it up against the upper side of the groove and causes the upper ring 5 to pack, mostly by the sharp upper corner next to the cylinder wall, except at the upper opening 10, which is closed by lower ring 5 bearing upward closing the lower portion of the opening and the inner ring bearing outward and against the pressure by the spring pressure of the ring which closes the inner portion and holds the pressure gases from getting behind the ring in the groove and from passing the packing.

Were it not for the inner surface of ring 5 and the outer surface of the inner ring 6 being ground to a perfect fit in contracted working form, (that is if they were only finished in the usual way by a turning lathe) the pressure gases would leak from the opening 10 between the outer and inner rings, and cover an area large enough to force the inner ring inward against its outward spring pressure and allow the pressure gases to escape to the lower opening 10 and past the piston, and would cause the inner ring to be inoperative in respect to its closing the opens 10 against leakage, when the piston is being driven by pressure.

It may be stated that this expansible packing is constructed to hug uniformly to the entire inner circumference of the cylinder wall, so that pressure gas cannot get between them so as to crowd the packing inward.

Therefore the rings can be fitted freely but practically leak tight, between the upper and lower face of the groove 3 when lubricated, and not cause what is well known as ring slaps, that sometimes break the rings. Due to such close fitting of the packing in the groove and the close fitting of the inner and outer rings, a leakage loss is prevented when the piston reverses between the compression and work strokes when the packing leaves its bearing on the lower face of the groove 3 and takes the upper, which is effected by this improvement and invention.

It may be stated that any of the rings may be constructed of other suitable metals than cast iron, but special cast iron of the well known kinds, is preferred.

In case it is desired to hold the packing from rotating in the piston groove, a dowel or pin may be fixed in the groove and extending outwardly and into the opening 20 of the inner ring.

It may be stated that the inner circular wall of the inner eccentric spring ring is concentric with the periphery of the outer eccentric spring packing rings, when the packing is contracted in working form and in the cylinder as herein shown, but it is not necessary that the inner ring inner circumference be absolutely concentric with the periphery of the outer packing ring, and the imaginary line of the inner ring does not necessarily need to absolutely match the imaginary lines of the outer packing rings.

It shall be noted that a portion of a sentence used in several of the claims, which is approximately thus: "finished to a determined size circle when inwardly sprung and contracted to normal working form," means a certain formation or construction of the rings, that is, having any of their circular walls formed to a true circle when contracted in their normal working form, which is not a true circle when it is expanded in a free state and not in use.

What I claim is:

1. In a metallic expansible piston packing, the combination of an inner eccentric spring open ring having its periphery a true circle when in its contracted normal working form and of a diameter smaller than the inner diameter of the cylinder in which it is used, a pair of open eccentric expansible packing rings each having its inner and outer peripheries true circles when in working position and surrounding and mounted side by side on said eccentric spring ring, for the purpose described.

2. In a metallic expansible piston packing, the combination of an inner eccentric spring ring open at its thin side and having its periphery a true circle when in its contracted normal working form and of a diameter smaller than the inner diameter of the cylinder in which it is used, a pair of eccentric expansible packing rings open at their thin sides and each having its inner and outer peripheries true circles when in working position and surrounding and mounted side by side on said eccentric spring ring, for the purpose described.

3. In a metallic expansible piston packing, the combination of an inner eccentric spring ring open in its thin side and having its periphery a true circle when in its inwardly sprung contracted normal working form, and of a diameter smaller than the inner diameter of the cylinder in which it is used, a pair of open eccentric expansible packing rings each having its inner and outer peripheries true circles when in working position and surrounding and mounted side by side on said eccentric spring ring, and means adapted to hold said rings one to the other against relative circumferential movement so that the openings cannot open one to the other, for the purpose specified.

4. In a metallic expansible piston packing, the combination of an inner eccentric spring ring open at the thin side and having its periphery a true circle when in its inwardly sprung and contracted normal working form, a pair of eccentric expansible cylinder bearing rings open in their thin sides and having their respective inner sides true to said outer periphery of the inner spring ring when in their inwardly sprung contracted normal working form, the outer periphery of the said rings a true determined cylinder size circle when in their inwardly sprung normal contracted working form, and surrounding and mounted side by side on said inner eccentric spring ring, and all of said rings so arranged that their openings do not open one to the other.

5. In a metallic expansible piston packing, the combination of an inner eccentric spring ring open at its thin side and having its periphery a true circle when in its contracted normal working form and of a diameter smaller than the inner diameter of the cylinder in which it is used, a pair of eccentric cylinder-bearing outer spring rings open at their thin sides and having their inner surface a true circle when in contracted normal working form and the same size as that of said inner ring periphery and the outer peripheries a true circle when in contracted normal working form and of a size of a predetermined cylinder in which they are to work, and said outer rings surrounding and mounted side by side on said inner ring so that the thick side of each of said outer rings is at the opening and thin side of said inner ring and arranged so that the openings do not open one to the other, and means adapted to hold said rings from relative rotative circumferential movement of one to the other and in concentric form.

6. In a metallic expansible piston packing, the combination of an inner eccentric spring open ring, open in the thinner portion at one side of an imaginary line crossing radially the center of the thicker and thinner portions, a dowel fixed in one end and in the thinner portion of said inner ring and approximately on said imaginary line and extending outward, an outer eccentric spring open ring equal in width to one-half that of said inner ring and open in the thinner portion at one side of an imaginary line crossing the exact center of the thicker and thinner portions, a groove in a predetermined side of and in the thicker portion of said outer ring on said imaginary line, a duplicate of said outer rings, and both mounted side by side on said inner ring with said grooves engaging said dowel, whereby both of said outer ring imaginary lines are held matched at all times and all three of the rings are held from relatively rotating one to the other, and so that the thicker portion of the inner ring is at the same side as the thinner portion of the pair of outer rings, and so that none of the ring openings can open one to the other.

7. In a metallic expansible piston packing, the combination of an inner eccentric spring open ring, open in the thinner portion to one side of an imaginary line crossing radially the center of the thicker and thinner portions and its periphery of a predetermined true circle when inwardly sprung to its contracted normal working form and having a predetermined width, a dowel fixed in one end and in the thinnest portion of said inner ring and approximately on said imaginary line when in said contracted position and extending outward, an outer eccentric spring open ring equal in width to one-half that of said inner ring and open in the thinner portion at one side of the imaginary line crossing the exact center of the thicker and the thinner portions, and having its inner surface a true circle, true to the peripheral size of said inner ring when inwardly sprung and contracted to normal working form, and having its outer surface true to a predetermined circle and cylinder size, when inwardly sprung and contracted to normal working form, a groove in a predetermined side of and in the thicker portion of said ring on said imaginary line, a duplicate of said outer ring and both mounted side by side on said inner ring, said grooves engaging the said dowel.

8. In a metallic expansible piston packing, the combination of an inner eccentric spring open ring, open in the thinner portion, and having its periphery a predetermined true circle when inwardly sprung to its contracted normal working form, an outer eccentric spring open ring having the opening of said ring in the thinner portion and at a predetermined distance to the side of an imaginary line radially crossing the exact center of the thicker and thinner portions, and having its inner surface a true circle the same size as that of the said inner ring periphery when inwardly sprung and contracted to normal working form, and the periphery a true determined cylinder size circle when inwardly sprung and contracted to normal working form, a duplicate of said outer ring and both mounted side by side on said inner ring so that said imaginary line of each and the thicker and thinner portions match and so that said openings do not come one opposite to the other and so that the thicker portion of each is at the same side as the thinner portion of said inner ring, and the pair of outer rings when side by side equal in width to that of said inner ring, and means for holding said rings from relatively rotating.

9. As an article of manufacture, a cylinder bearing eccentric spring open ring having an opening in the thin portion thereof and at one side of an imaginary line crossing the exact center of the thickest and thinnest portions and having its inner surface a predetermined true circle size when inwardly sprung and contracted to normal working form, and the periphery a predetermined cylinder size true circle when inwardly sprung and contracted to normal working form, and having a radial groove opening into the inner periphery of its thick portion and located on said imaginary line, for the purpose specified.

10. In a metallic expansible piston packing, the combination of an inner spring expanding, open ring having a diameter smaller than the inner diameter of the cylinder in which it is used, a plurality of open outer cylinder bearing rings each having its outer periphery a true circle when in working position mounted side by side on and surrounding the said inner spring ring, whereby a tight fit is made between the outer peripheries of the outer rings and the cylinder wall, the inner peripheries of the outer rings and the outer periphery of the inner ring having true circles at the expansion space zone of the outer rings when in working positions, for the purpose described.

11. In a metallic expansible piston packing, the combination of an inner eccentric spring expanding open ring having a diameter smaller than the inner diameter of the cylinder in which it is used, a plurality of open outer cylinder bearing rings each having its outer periphery a true circle when in working position mounted side by side on and surrounding the said inner spring ring, whereby a tight fit is made between the outer peripheries of the outer rings and of the cylinder wall, the inner peripheries of the outer rings and the outer periphery of the inner ring having true circles at the expansion space zone of the outer rings when in working positions, for the purpose described.

12. In a metallic expansible piston packing, the combination of an inner eccentric spring expanding open ring having a diameter smaller than the inner diameter of the cylinder in which it is used, a plurality of open outer eccentric cylinder bearing rings each having its outer periphery a true circle when in working position mounted side by side on and surrounding the said inner spring ring, whereby a tight fit is made between the outer peripheries of the outer rings and the cylinder wall, the inner peripheries of the outer rings and the outer periphery of the inner ring having true circles at the expansion space zone of the outer rings when in working positions, for the purpose described.

13. In a metallic expansible piston packing, the combination of an open inner spring ring having its periphery a predetermined true circle when in its inwardly sprung and contracted normal working form, a pair of open expansible packing rings each having its outer circular surface a true determined cylinder size circle, and the inner side a true circle the same size as that of said determined inner ring periphery when in its working position, and surrounding and mounted side by side on the said inner spring ring, means adapted to hold said rings one to the other against relatively rotative circumferential movement, so that the openings do not open one to the other, whereby the outer rings make a gas-tight fit with the cylinder wall and the inner ring closes the openings in the outer rings gastight on their inner sides.

14. In a metallic expansible piston packing, the combination of two outer open expansible cylinder bearing rings and an open spring expansion ring mounted within said uter rings and having the adjacent engaging walls of the rings of corresponding predetermined forms at the expansion zone and the outer peripheries of the outer rings a predetermined form corresponding to the cylinder wall form in which it is to be used when in contracted working positions, causing the engaging surfaces of the rings to bear gas tight against each other at the expansion opening zone of the outer rings and the outer peripheries of the outer rings to bear gas tight against the cylinder wall in which they are to be used, whereby an efficient fitting of all the working surfaces of all of the rings is produced when in contracted working positions within the cylinder in which they are to be used, and means for holding said rings so that the expansion openings do not open one to the other.

15. In a metallic expansible piston packing, the combination of an outer expansible cylinder bearing ring packing having an overlapping expansion opening zone, an inner open spring expanding ring within said outer ring packing, the engaging surfaces of said outer packing and said inner spring ring having true circles at said expansion zone when in normal working position and the periphery of said outer packing having a true circle when in normal working position, whereby a gas tight seal is made in said expansion zone, and a gas tight joint is made between the periphery of said packing and the cylinder wall in which it is to be used.

16. A metallic piston packing comprising inner and outer open expansible rings, the engaging surfaces of the rings having true circles when in contracted working form at the expansion opening zone, the inner ring of smaller diameter than the cylinder in which it is to be used and the outer periphery of the packing having a true circle when in contracted working form and of cylinder size, whereby a gas tight seal is made between the engaging surfaces of the rings in said expansion opening zone and a gas tight joint is made between the outer periphery of said packing and the wall of the cylinder in which it is used.

17. In a metallic expansible piston packing, the combination of an outer cylinder bearing expansible ring packing having an outer periphery of a predetermined form conforming gas tight to the cylinder wall in which it is to be used when in working position and having an overlapping expansion opening zone, an inner spring expanding open ring mounted within said outer packing and the adjacent walls of said outer packing and said inner ring having predetermined forms conforming gas tight at said overlapping expansion opening zone when in working positions, whereby said gas tight seals are made for the purpose described.

STEWART S. KURTZ, Jr.

Witnesses:
MELVIN A. YEAKLEY,
F. F. KURTZ.